(No Model.)
W. STANLEY, Jr. & J. F. KELLY.
ALTERNATING CURRENT MOTOR.
No. 479,727.  Patented July 26, 1892.
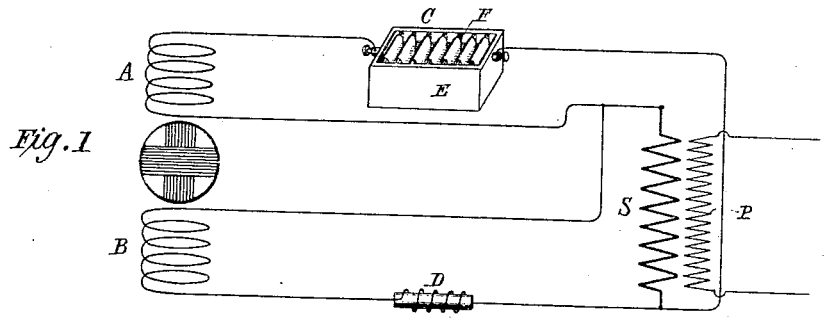
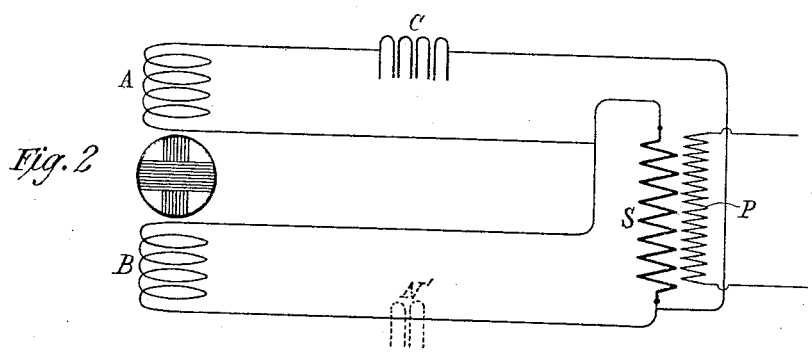
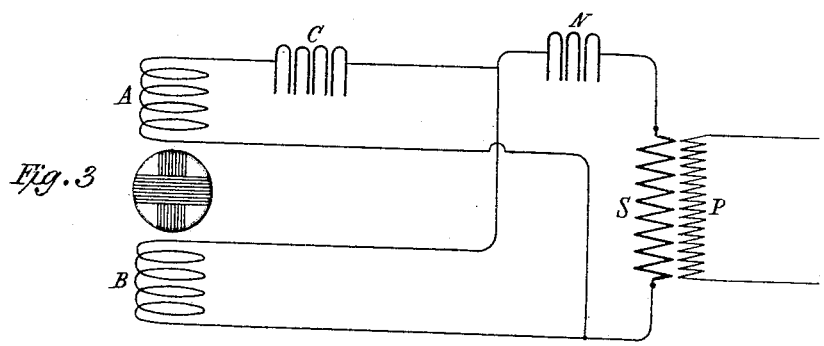
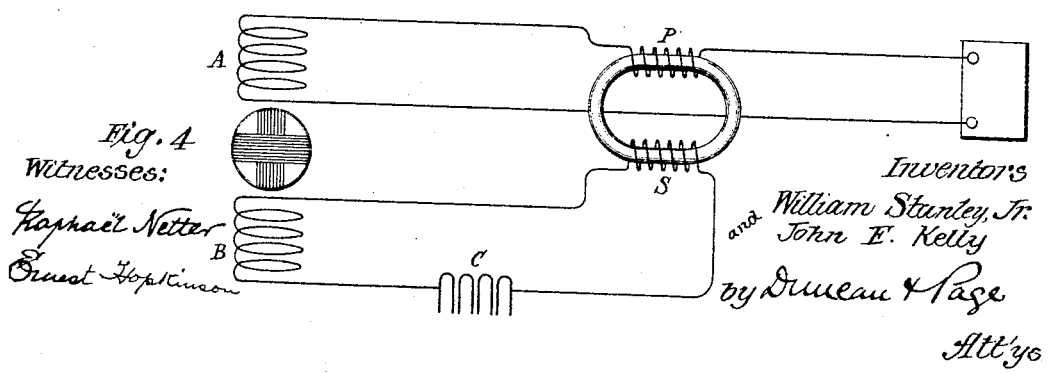
Witnesses:
Raphael Netter
Ernest Hopkinson
Inventors
William Stanley, Jr.
John F. Kelly
by Duncan & Page
Att'ys

UNITED STATES PATENT OFFICE.

WILLIAM STANLEY, JR., AND JOHN F. KELLY, OF PITTSFIELD, MASSACHUSETTS.

ALTERNATING-CURRENT MOTOR.

SPECIFICATION forming part of Letters Patent No. 479,727, dated July 26, 1892.

Application filed March 8, 1892. Serial No. 424,349. (No model.)

*To all whom it may concern:*

Be it known that we, WILLIAM STANLEY, Jr., and JOHN F. KELLY, citizens of the United States, residing at Pittsfield, in the county of Berkshire and State of Massachusetts, have invented certain new and useful Improvements in Alternating-Current Motors, of which the following is a specification, reference being had to the drawings accompanying and forming a part of the same.

Certain electrical devices, particularly motors, require for their operation alternating currents differing in phase, which are caused to flow through separate or independent energizing-circuits; and it is frequently desirable to obtain these currents from a single source, as in the case of isolated motors operated by transformers connected with a main circuit from a more or less distant source.

The subject of our present invention is a new and improved means of obtaining this difference of phase between two or more alternating currents in general; but more particularly such as are derived from a single source, such as the secondary of a transformer.

While in principle and without material change the invention is applicable to those cases where three or more currents are employed, we deem it sufficient for purposes of this case to describe the invention as applied to the operation of two circuit-motors which require for their most efficient operation two currents which differ by a quarter-phase. From this and from the description of one type only of such motors the general nature and applicability of the invention will be understood.

It is well known that if two conducting-plates be immersed in an electrolyte by which they are not chemically affected and a current passed from one to the other through the electrolyte the condition of what is known as "polarization" is realized and an electro-motive force established which manifests itself on the fall of the potential which produced it. If in a circuit of alternating currents such a polarization cell be included, the electro-motive force of polarization will be greater the greater the number of couples or pairs in series, and the higher this electro-motive force the greater will be the negative lag of the current. In other words, the phases of current will be ahead of the impressed electro-motive force in proportion to the excess of electro-motive force of polarization over that of the self-induction, which is practically always present. On the other hand, the higher the electro-motive force of self-induction in a given circuit the greater the positive lag of current, or, in other words, the farther the phase of current will be behind the impressed electro-motive force. We utilize these effects in an efficient and economical manner in any case where it is desired to obtain between two alternating currents a given difference of phase; and, as will more fully hereinafter appear, we may do this in a variety of ways.

Referring now to the drawings, Figure 1 is a diagram illustrating the application of the invention to a motor or other device having two energizing-circuits through which are to flow alternating currents differing in phase. Fig. 2 is a similar diagram illustrating a modification, and Figs. 3 and 4 are diagrams of other modifications which will be more fully described.

Let A B designate the energizing-circuits of a quarter-phase motor to which current is to be supplied from the secondary S of a transformer of which P is the primary. In one of the circuits or branches from the secondary, including one of the energizing-coils, as A, a polarization-cell C is included, which has an electro-motive force sufficiently high to impart a negative lag of forty-five degrees to the current passing in the circuit. In the other circuit, or that containing the coil B, a self-induction device D is included, that produces a positive lag of forty-five degrees, so that the total difference of phase between the two currents will be ninety degrees. It has heretofore been proposed to accomplish a like result by the use of condensers and self-induction devices; but the employment of polarization-cells is much more efficient and economical, mainly on account of their cheapness, their immense capacity in small compass, and the slight probability of their being injured by the current.

The manner in which the cells are constructed is indicated in Fig. 1, in which E is an insulating trough or box divided into compartments or cells by the partitions F. In each partition is a pair of plates, the whole being connected in series through the electrolyte that fills the trough.

It is to be observed that in all cases the polarization-cell should be so constructed as to perform its proper function without the breaking down or electrolysis of the electrolyte, and the maximum electro-motive force which the cell as a whole is ever called upon to yield should be safely below that which would produce electrolysis. A further point to be observed on account of greater efficiency is to make the resistance as low as practicable.

Inasmuch as the object sought is to obtain between the two currents a given difference in phase, the specific arrangement described may be varied. For example, in Fig. 2 sufficient capacity is included in the circuit of coil A to produce a negative lag of, say, sixty degrees, while the self-induction of the other circuit is sufficient only to produce a positive lag of thirty degrees.

If the polarization-cell in one circuit and the self-induction in the other are so adjusted as to balance, or, in other words, so that the positive and negative lag will counterbalance, then the current in the main conductor from the source will coincide with the impressed electro-motive force, since it will be opposed by a dead resistance only; but such conditions would rarely obtain in practice, so that a lag in the main circuit may usually be expected. To overcome this and therefore to utilize the entire output of the generator in the operation of the motor, we introduce in the main circuit a polarization-cell N, the electro-motive force of which will neutralize that of the self-induction producing the lag. (See Fig. 3.)

It is obvious that no special appliance for producing self-induction need be used if the circuit itself has a sufficiently high self-induction, and it also follows that since both circuits possess more or less self-induction under all circumstances the balance between the positive and negative lag may be secured by inserting polarization-cells of proper capacity in both circuits. (See Fig. 2, where one of the cells N' is indicated in dotted lines.)

In the practical application of the invention the compensation for lag by the means above described should be made for full load, as it may not be made for variable loads, owing to the reaction of the armature, which is greatest when the full load is on.

In Fig. 4 is illustrated another modification of the invention. M in this figure represents the generator. The main circuit includes the primary P of a transformer and one of the coils, as A, of the motor. The secondary coil S is in circuit with the other coil B.

If there were no polarization-cell in the secondary, the lag of the secondary current behind the primary current would approximate to one hundred and eighty degrees; but if a polarization-cell C be included in the secondary circuit and constructed so that its electro-motive force equals that of the self-induction in the secondary the lag will be so reduced as to be only ninety degrees behind the primary.

In general the effect of the polarization-cell is the opposite to that of self-induction, and in the case of any two circuits of the kind described it may be employed in either or both, according to the special conditions which exist to produce between the two circuits a given difference of phase.

What we claim is—

1. The combination, with an alternating-current motor having independent energizing-circuits, of a polarization-cell included in one circuit and a self-induction device in the other, as set forth.

2. The combination, with an alternating-current motor having independent energizing-circuits, of a polarization-cell included in one circuit adapted by its electro-motive force to advance the phase of the current in its circuit with respect to that of the current in the other circuit, as set forth.

3. In an alternating-current motor having energizing-circuits adapted by predetermined relations of self-induction and capacity to produce a difference in phase between the currents therein, the combination, with one or both circuits as the means for neutralizing the lag of self-induction, of conducting-plates immersed in an electrolyte and connected in series in the same, as herein set forth.

4. The combination, with a main circuit and branches from the same of different self-induction and capacity, whereby a difference in phase will be produced in the currents passing therein, of a polarization-cell included in the main circuit and adjusted or adapted to neutralize the resultant lag of the two branch circuits.

WILLIAM STANLEY, JR.
JOHN F. KELLY.

Witnesses:
WILSON D. CARPENTER,
HENRY J. RYAN.